United States Patent
Ehrlich

[15] 3,659,994
[45] May 2, 1972

[54] APPARATUS FOR INJECTION MOLDING

[72] Inventor: Josef Ehrlich, Pacific Palisades, Calif.
[73] Assignee: Winbrook China, Inc., Santa Monica, Calif.
[22] Filed: July 1, 1969
[21] Appl. No.: 838,229

[52] U.S. Cl. ................................................425/242, 264/87
[51] Int. Cl. ........................................B29b 1/26, B29b 7/16
[58] Field of Search ......................25/29, 28, 22, 2; 164/341; 18/43, 30 LA, 39, 5 BW; 269/94, 32; 249/144, 121, 122, 142, 160, 167, 168, 169; 264/86, 87

[56] References Cited

UNITED STATES PATENTS

| 2,583,842 | 1/1952 | Hendrickson | 25/29 X |
|---|---|---|---|
| 2,646,607 | 7/1953 | Davis | 249/144 X |
| 2,964,822 | 12/1960 | Tomkins | 25/29 X |
| 3,027,155 | 3/1962 | Paterson | 269/94 UX |
| 3,470,284 | 9/1969 | Hartmann | 25/28 UX |
| 1,712,978 | 5/1929 | Brinkman | 264/86 |
| 3,199,159 | 8/1965 | Wernecke | 18/30 LA X |
| 3,338,998 | 8/1967 | Settembrini | 18/5 BN X |
| 3,498,496 | 6/1969 | Arnold et al. | 25/2 |

Primary Examiner—Robert D. Baldwin
Assistant Examiner—Norman E. Lehrer
Attorney—Herzig & Walsh

[57] ABSTRACT

Injection molding apparatus for molding articles, particularly ceramic articles. The injection molding takes place at high pressure. Particular clamping means are provided to clamp the cover or top on the mold while injecting at high pressure. Particular means are provided for handling the molds and for removing the top or cover of the carrier and for removing the finished piece. The mechanism facilitates handling of the molds and makes possible rapid and repeated use of the molds and thereby greatly augments their utility.

4 Claims, 6 Drawing Figures

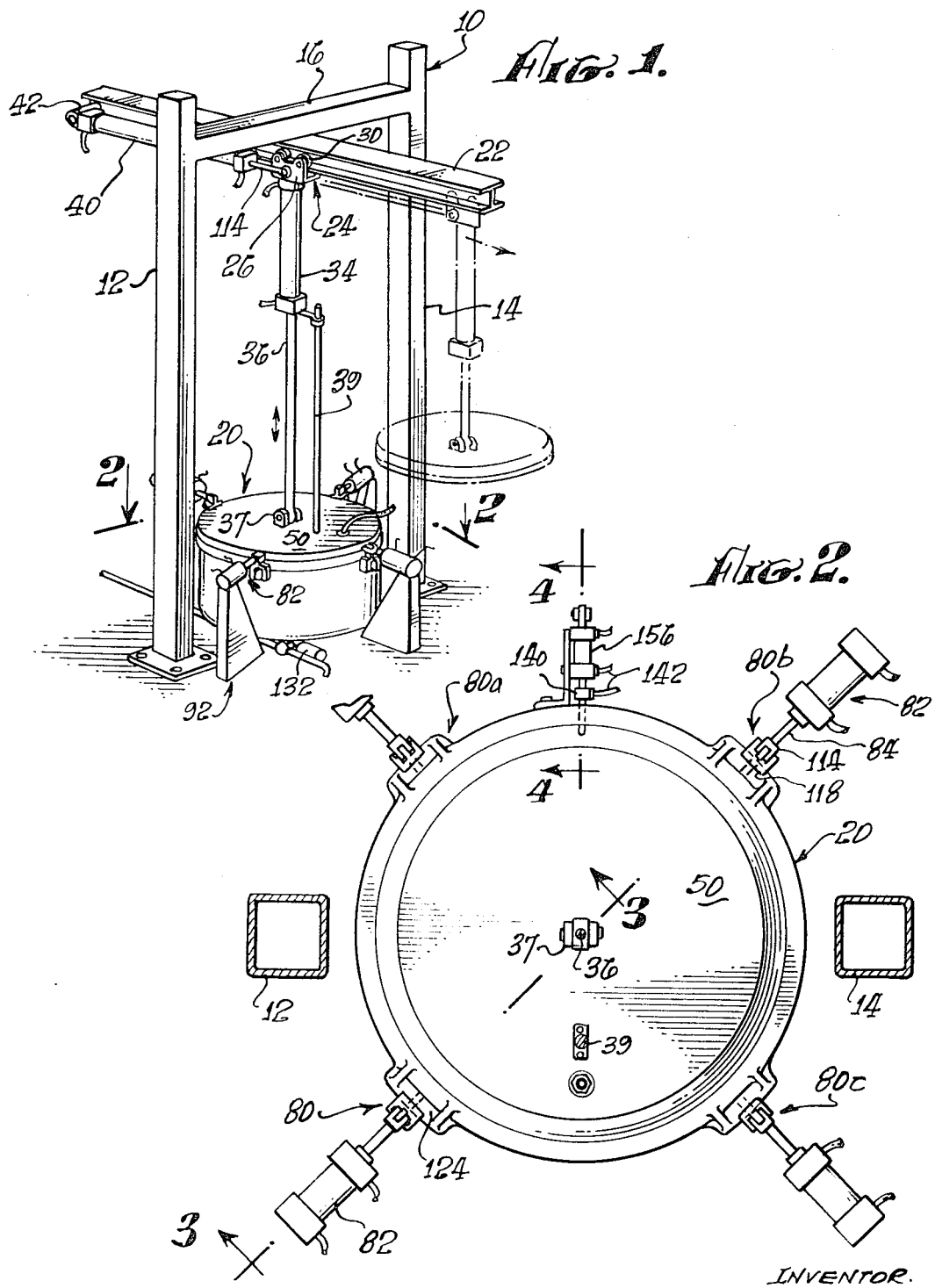

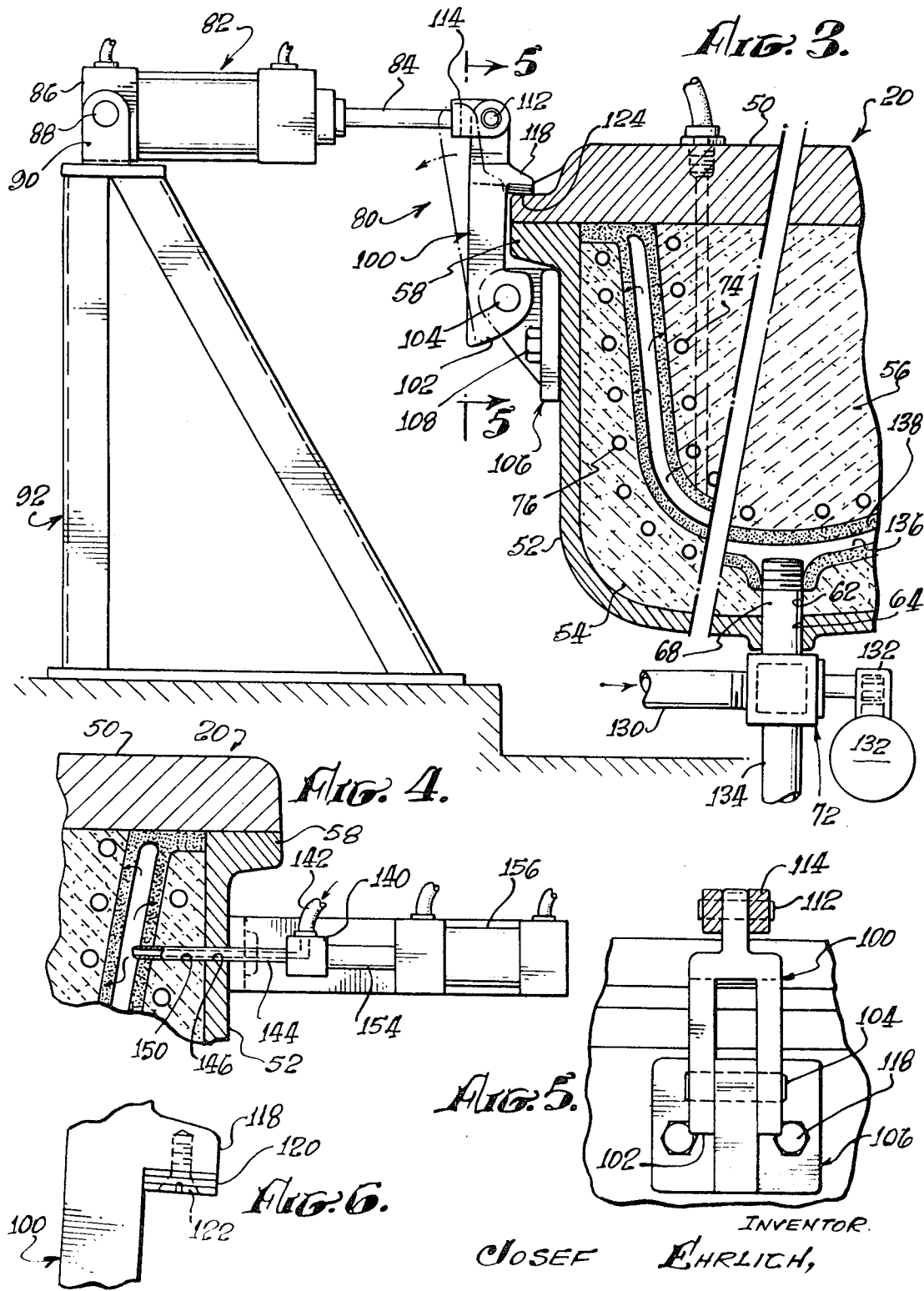

3,659,994

APPARATUS FOR INJECTION MOLDING

SUMMARY OF THE INVENTION

The invention relates to apparatus for molding plasticized material and in the exemplary form of the invention described herein it is particularly adapted for the molding of ceramic articles.

For many years large ceramic articles have been cast in plaster molds. The plaster dewaters the slip and also acts electrolytically on the defloculated slip to form solid pieces. The molds such as have been known to the prior art are very heavy to handle, and generally can be used only once a day. It is a primary object of this invention to overcome this deficiency by making it possible to form ceramic articles by injection molding in a minimum of time and further to make it possible to use the dies rapidly and repeatedly so that they are used many times per day. In other words it is an object of the invention to realize a machine capable of injection forming of ceramic articles at mass production speed with semi-skilled help and to eliminate the heavy work.

Specific improvements are embodied in the apparatus whereby the above referred to objectives are realized. In the preferred exemplary form of the invention the mold (die) is suspended in a carrier which is especially constructed to facilitate injection forming by way of injection of the slip into the mold from the bottom under very high pressure. The carrier is suspended from overhead means and is transportable thereby, and mechanical means are provided to lift the top of the carrier to allow an operator to remove the finished piece. Inasmuch as the injection molding takes place at extremely high pressure of perhaps 96,000 pounds, specially designed clamps are necessary to hold the top or cover of the mold in place while injecting. These clamps must be especially designed so that the pressure itself does not cause them to release the top of the carrier. On the other hand, however, they must be designed so that prohibitively high forces are not required to hold them in clamped position. An improved clamping construction has been invented whereby all of the desired objectives are realized.

Further improvements reside in the provision of means for conveying additional pressure into the interior of the mold whereby the hollow cast parts of the piece that has partly solidified can be placed under additional pressure.

The manner in which the foregoing objects are realized and further objects will become apparent from the following detailed description and annexed drawings wherein:

FIG. 1 is a perspective view of a preferred form of the invention;

FIG. 2 is a sectional view taken along the line 2—2 of FIG. 1;

FIG. 3 is a sectional view of the form of the invention shown in FIGS. 1 and 2 illustrating the clamping means in detail;

FIG. 4 is a sectional view taken along line 4—4 of FIG. 2;

FIG. 5 is a sectional view taken along the line 5—5 of FIG. 3; and

FIG. 6 is a detail view illustrating the shims used with the clamping means.

In order to facilitate realization of the objects set forth in the foregoing, means are provided for ease and convenience of handling the molds to speed up the molding process and to expedite operations using either a single mold or multiples of similar molds. In FIG. 1 numeral 10 designates a supporting structure or frame comprising uprights 10, 12 and 14 and transverse member 16. Numeral 20 designates a mold carrier supported from the structure described. Supported from the cross member 16 is a rail in the form of an I-beam 22 as shown. Numeral 24 designates a trolley comprising a U-shaped chassis 26 at the upper part of which are mounted four rollers such as shown at 30 journalled on shafts in a position so that the rollers can ride in the channels of the I-beam 22. The trolley 24 supports a hydraulic cylinder 34 having a stem 36 that extends vertically as shown, connecting to the top of the mold cover by yoke 37. Numeral 39 designates a guide stem.

Numeral 40 designates another hydraulic cylinder that is supported from the rail 22 at one end by way of a supporting bracket 42. It has a stem 43 pivotally connected to the chassis 24 whereby the cylinder 34 and the carrier supported from it can be caused to traverse along the rail 22. The hydraulic cylinders shown might, of course, be air cylinders or other types of actuators.

The mold carrier is shown more in detail in FIGS. 2 and 3. In the exemplary form of the invention as described herein, the mold or die and its core are shown as being adapted for molding sanitary ceramic lavatories or the like. In FIG. 3 the mold carrier is shown at 52, the mold at 54 and the core at 56. The mold and core are made of plaster or other porous material, the ceramic ware being molded in the cavity between them. The carrier has an upper peripheral flange 58 to which the top 50 is clamped as will be described. The mold 54 and the carrier 52 have apertures or openings at the bottom as designated at 62 and 64 through which extends an injection pipe or tube 68 which connects to a three way valve as designated at 72. Tubes as shown at 74 and 76 may be provided within the core and mold for purposes that are conventional, and well known in the art and, therefore, will not be dwelt on herein.

Around the periphery of the flange 58 on the carrier 52 and the top 50 are provided a series of clamps as designated at 80a, 80b, and 80c in FIG. 2. The clamp 80 is shown more in detail in FIG. 3. These clamps are operated by hydraulic cylinders such as shown at 82 in FIG. 3. The cylinder 82 has a stem 84 and it has an end part 86 which is pivotally mounted on a pivot shaft 88 in a yoke 90 at the top of supporting member 92. The clamping member itself is designated at 100. It is bifurcated as shown at 102 and is pivoted on a pivot shaft 104 that is journalled in member 106 that is attached to the side of the carrier 52 by bolts 108.

The upper end of the clamp 100 is journalled on a pivot stem 112 between the wings of yoke or clamp 114 at the end of the stem 84 of hydraulic cylinder 82. The clamping member 100 has an extending clamping lug 118 shown more in detail in FIG. 6. This lug forms a square shoulder as shown and secured to the lug are a series of overlying shim members 120 that are attachable by screw 122. The shims come into contact with a ledge formed by an extending flange 124 on the top or cover 50 as may be seen more clearly in FIG. 2. The structure of all of the clamps 80 is alike and they are equally angularly spaced around the carrier and its top and, therefore, the other ones need not be described in detail.

FIG. 3 shows the clamp 100 in clamped position, being held in that position by pressure in the hydraulic cylinder 82, which, of course, may be supplied through flexible tubes in a conventional manner. The axis of rotation of the clamp 100 is directly below the ledge 124 on the top 50 with which the shims come into engagement. The configuration and orientation of the clamp 100 is such, however, that for the shims 120 to come into clamping engagement with the ledge 124 the clamp moves slightly past the vertical position, that is, slightly past top dead center and that amount may, by way of example, be 1° past top dead center. This orientation whereby the shims clamp the top at this position can, of course, be nicely controlled by way of adjustment of the shims 120. This is, of course, extremely important in order to hold the pressure within the mold. The clamp has to go over center a slight amount since if it did not, and the clamping surface on the lug 118 was exactly parallel to the clamping surface on the ledge 124 it would not be possible to release the clamp, that is, the clamping lug 118 has to move away from the ledge slightly in order to unclamp. Furthermore, with the clamping member 100 in a position such as shown in FIG. 3, the hydraulic force or effort required by the cylinder 82 is small rather than being prohibitively high. Most of the force exerted on the latch or clamping member by pressure within the mold appears as a stress on the clamp exerted on its pivot shaft 104 which is, of course, very sturdy and rugged and able to withstand this stress. As previously explained, the desired position of the clamping member 100 with the distribution of stresses as explained can effectively be realized by adjustment of the shims 120.

The slip can be injected into the cavity between the mold and the core by way of a pipe 130 under appropriate pressure and through three way valve 72 which can be actuated by a hydraulic cylinder 132. The three way valve 72 can be shifted to another position in order to drain slip out of the mold that has not set through a pipe 134.

In hollow casting operations (drain cast) the slip solidifys adjacent to the interior surfaces of the mold 54 and the exterior surfaces of the core 56 as designated at 136 and 138 in FIG. 3. Thus, the cast ware has a cavity in it containing slip that is still in liquid form. This slip can be drained out through three way valve 72 and the pipe 134. Apparatus is provided to inject additional fluid pressure into the cavity within the ware in order to force out the slip that has not set and to provide pressure within the cavity to prevent the hollow cast ware from collapsing.

Fluid pressure (air or water) may be injected into the cavity in the ware through a fitting as shown at 140 in FIG. 4 to which is connected a flexible air line 142. Extending from this fitting is an extendable and retractable tubular stem 144 which extends through an aperture 146 in a side of the carrier 52 as shown and through an aperture 150 in the mold 54 and it may be extended through a side wall of the cast ware into the cavity within it as shown. The fitting 140 and tubular stem 144 are on the end of the piston rod or stem 154 of a hydraulic cylinder 156 and to which hydraulic fluid can be supplied by flexible lines in a conventional manner as illustrated. Thus, when the clamps are closed the cylinder 156 can be operated to extend the tubular fitting 144 into the cavity within the cast ware as described and at the end of the cycle pressure can be injected into the cavity to force out any remaining slip that is in the cavity. The pressure within the cavity will prevent collapsing of the walls of the cast ware that have set against the core and mold surfaces.

From the foregoing those skilled in the art will understand the nature and construction of the machine and its operation which may be summarized as follows. The structure as shown in FIG. 1 provides convenient handling means for transporting mold carriers and lifting the tops for purposes of removing the cast ware described more in detail in the foregoing.

FIG. 1 shows the position of a mold carrier in a position for molding and, of course, injection molding or casting can be accomplished by injecting material into the cavity between the mold and the core. The unset part of the slip can be drained out of the cavity in the cast ware. By means of the injection nozzle fluid such as air under pressure can be injected into the cavity in the cast ware to assist in forcing out the uncast slip and to prevent the hollow cast part from collapsing.

The top is clamped onto the mold by way of a plurality of special clamps comprising clamping members pivoted to the mold. The clamping members swing around their pivots so as to move slightly over vertical dead center position in order to clamp against the top. The clamping members each have a clamping lug fitted with shims to that the angular position at which the clamps come into clamping engagement can be nicely adjusted. They are held in position by hydraulic cylinders, the geometrical orientation being such that the force required to hold them in clamping position is not prohibitively high.

The foregoing disclosure is representative of a preferred form of the invention and is to be interpreted in an illustrative rather than a limited sense, the invention to be accorded the full scope of the claims appended hereto.

I claim:

1. An injection casting machine comprising means including parts forming a mold carrier, a top for the mold carrier and a mold, means for injecting material to be cast into the mold, means for clamping the mold carrier and top together, the mold carrier having a peripheral rim and the top having a peripheral rim, a clamping member pivotally secured to one of said parts to rotate about a pivot center, said member having a lug engageable with the rim of the other part, means for holding said clamping member in engaged position, said engaged position being beyond a center position determined by a line through said pivot center normal to the plane of the rim such that the clamping member has a component of movement normal to the rim of the other part whereby the said lug on the clamping member is allowed to disengage therefrom.

2. A structure as in claim 1 including fluid pressure means for actuating said clamping member.

3. A structure as in claim 1 including a plurality of shims positioned between said lug on the clamping member and said peripheral rim.

4. A machine as in claim 1 wherein the clamping member is pivotally attached to the mold and has a lug engageable with the rim on the top.

* * * * *